(12) United States Patent
Xu et al.

(10) Patent No.: US 11,724,717 B2
(45) Date of Patent: Aug. 15, 2023

(54) IMPLEMENTATION OF DYNAMIC COST FUNCTION OF SELF-DRIVING VEHICLES

(71) Applicants: Baidu USA LLC, Sunnyvale, CA (US); Baidu.com Times Technology (Beijing) Co., Ltd., Beijing (CN)

(72) Inventors: Xin Xu, Beijing (CN); Fan Zhu, Sunnyvale, CA (US); Yu Dong, Beijing (CN); Lin Ma, Beijing (CN)

(73) Assignees: BAIDU USA LLC, Sunnyvale, CA (US); BAIDU.COM TIMES TECHNOLOGY (BEIJING) CO., LTD., Beijing (CN)

( * ) Notice: Subject to any disclaimer, the term of this patent is extended or adjusted under 35 U.S.C. 154(b) by 761 days.

(21) Appl. No.: 16/627,748

(22) PCT Filed: Dec. 20, 2019

(86) PCT No.: PCT/CN2019/127126
§ 371 (c)(1),
(2) Date: Dec. 30, 2019

(87) PCT Pub. No.: WO2021/120202
PCT Pub. Date: Jun. 24, 2021

(65) Prior Publication Data
US 2021/0188319 A1    Jun. 24, 2021

(51) Int. Cl.
*B60W 60/00* (2020.01)
*B60W 30/09* (2012.01)

(52) U.S. Cl.
CPC ........ *B60W 60/0016* (2020.02); *B60W 30/09* (2013.01)

(58) Field of Classification Search
CPC .................................................. B60W 2555/60
See application file for complete search history.

(56) References Cited

U.S. PATENT DOCUMENTS

| 2019/0086932 A1 | 3/2019 | Fan et al. |
| 2021/0046924 A1* | 2/2021 | Caldwell .......... B60W 30/0956 |

FOREIGN PATENT DOCUMENTS

| CN | 105589472 A | 5/2016 |
| CN | 105710888 A | 6/2016 |

(Continued)

*Primary Examiner* — Russell Frejd
*Assistant Examiner* — Ana D Thomas
(74) *Attorney, Agent, or Firm* — Womble Bond Dickinson (US) LLP

(57) ABSTRACT

Various embodiments of the invention enable an ADV to dynamically adjust its behaviors to emulate behaviors of a vehicle operated by a human driver when the ADV encounters an obstacle. A dynamic cost function can be used to collect real-time values of a set of parameters, and use the real-time values to constantly adjust a preferred safety distance where the ADV can be stopped ahead of the obstacle. An method includes determining a first distance to the obstacle in response to detecting an obstacle ahead of the ADV; and for each of a number of iterations, collecting a real-time value for each of a set of parameters, determining an offset to the first distance using the real-time value for each of the set of parameters, calculating a second distance based on the first distance and the offset, and controlling the ADV in view of the second distance using an expected value of each of the set of parameters, such that the ADV can stop at a point having the second distance to the obstacle.

20 Claims, 7 Drawing Sheets

(56) References Cited

FOREIGN PATENT DOCUMENTS

| | | |
|---|---|---|
| CN | 107168058 A | 9/2017 |
| CN | 107748561 A | 3/2018 |
| CN | 109017786 A | 12/2018 |
| CN | 109521756 A | 3/2019 |
| CN | 109808686 A | 5/2019 |
| CN | 110032193 A | 7/2019 |
| CN | 110083149 A | 8/2019 |
| CN | 110316185 A | 10/2019 |
| CN | 110320809 A | 10/2019 |
| EP | 3342657 A1 | 7/2018 |
| JP | 2002163779 A | 6/2002 |
| JP | 2017069830 A | 4/2017 |
| JP | 2018097704 A | 6/2018 |
| WO | 2019069425 A1 | 4/2019 |

\* cited by examiner

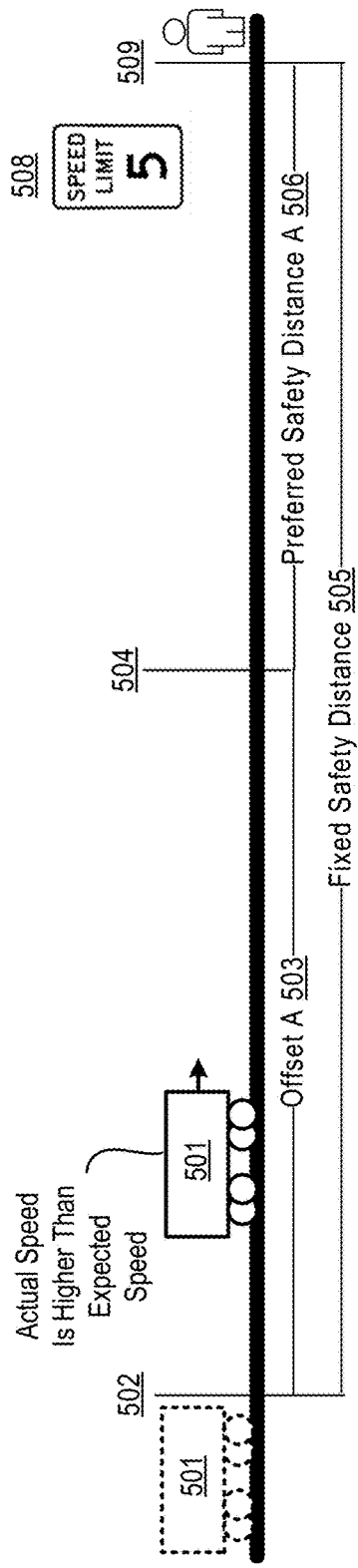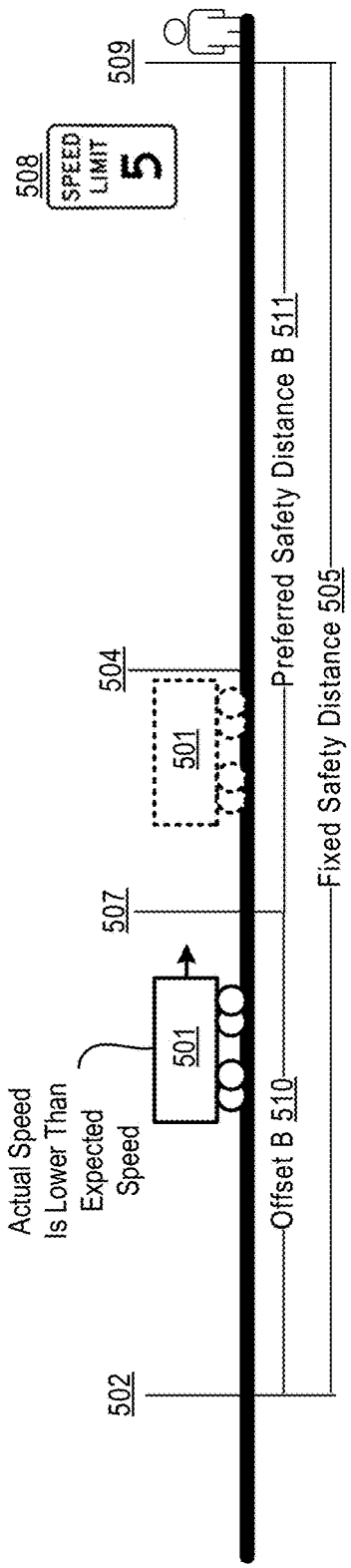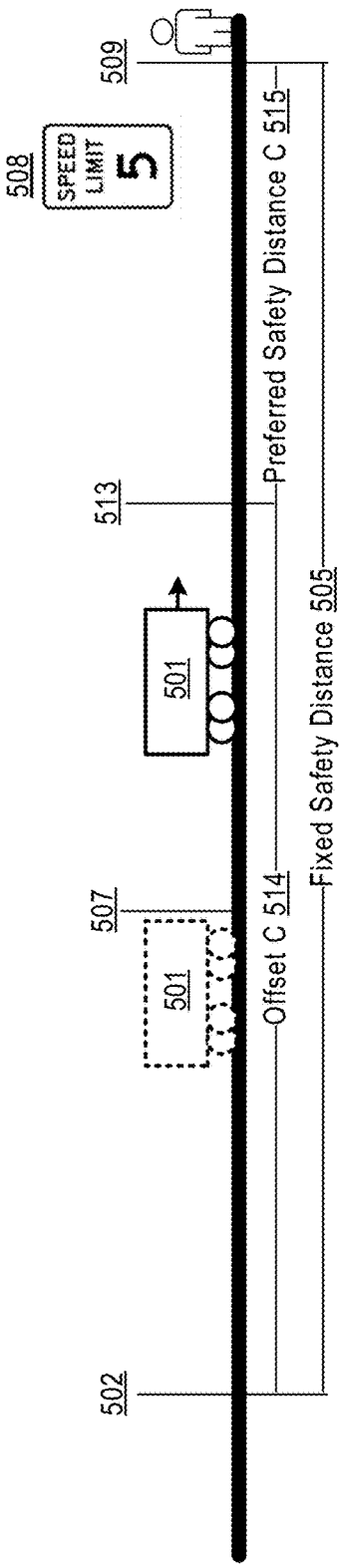

IMPLEMENTATION OF DYNAMIC COST FUNCTION OF SELF-DRIVING VEHICLES

CROSS-REFERENCE TO RELATED APPLICATION

This patent application is a U.S. National Phase Application under 35 U.S.C. § 371 of International Application No. PCT/CN2019/127126, filed Dec. 20, 2019, entitled "AN IMPLEMENTATION OF DYNAMIC COST FUNCTION OF SELF-DRIVING VEHICLES," which is incorporated by reference herein by its entirety.

TECHNICAL FIELD

Embodiments of the present disclosure relate generally to operating autonomous driving vehicles. More particularly, embodiments of the disclosure relate to the use of dynamic cost functions in an autonomous driving vehicle to emulate the behaviors of a vehicle operated by a human driver.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers. Motion planning and control are critical operations in autonomous driving, and can use finite state machines for decision making in these operations. The choice of states can typically be made using cost functions with fixed parameters.

For example, in the presence of a static obstacle, the vehicle can stop at a calculated safety distance to avoid collision with the static obstacle; in the presence of a moving obstacle, the vehicle can reduce speed and follow behind. However, in some cases, those pre-defined actions are insufficient, and actions like those of a human driver are more desirable.

SUMMARY

According to a first aspect, some embodiments of the present disclosure provide computer-implemented method for operating an autonomous driving vehicle (ADV), the method including: in response to detecting an obstacle ahead of the ADV, determining a first distance to the obstacle; and for each of a plurality of planning cycles, performing: determining an offset to the first distance based on a real-time value for each of a set of a plurality of parameters, calculating a second distance based on the first distance and the offset, and performing speed planning based on the second distance to control a further speed of the ADV, such that the ADV can decelerate and stop at a point with the second distance to the obstacle.

According to a second aspect, some embodiments of the present disclosure provides a non-transitory machine-readable medium having instructions stored therein for operating an autonomous driving vehicle (ADV), the instructions, when executed by a processor, causing the processor to perform operations, the operations including: in response to detecting an obstacle ahead of the ADV, determining a first distance to the obstacle; and for each of a plurality of planning cycles, performing: determining an offset to the first distance based on a real-time value for each of a set of a plurality of parameters, calculating a second distance based on the first distance and the offset, and performing speed planning based on the second distance to control a further speed of the ADV, such that the ADV can decelerate and stop at a point with the second distance to the obstacle.

According to a third aspect, some embodiments of the present disclosure provides a data processing system, including: a processor; and a memory coupled to the processor to store instructions, which when executed by the processor, cause the processor to perform operations, the operations including: in response to detecting an obstacle ahead of the ADV, determining a first distance to the obstacle; and for each of a plurality of planning cycles, performing: determining an offset to the first distance based on a real-time value for each of a set of a plurality of parameters, calculating a second distance based on the first distance and the offset, and performing speed planning based on the second distance to control a further speed of the ADV, such that the ADV can decelerate and stop at a point with the second distance to the obstacle.

BRIEF DESCRIPTION OF THE DRAWINGS

Embodiments of the disclosure are illustrated by way of example and not limitation in the figures of the accompanying drawings in which like references indicate similar elements.

FIGS. 5A-5C graphically illustrate an example of a process performed by a dynamic cost function in accordance with an embodiment.

DETAILED DESCRIPTION

Figure 1:
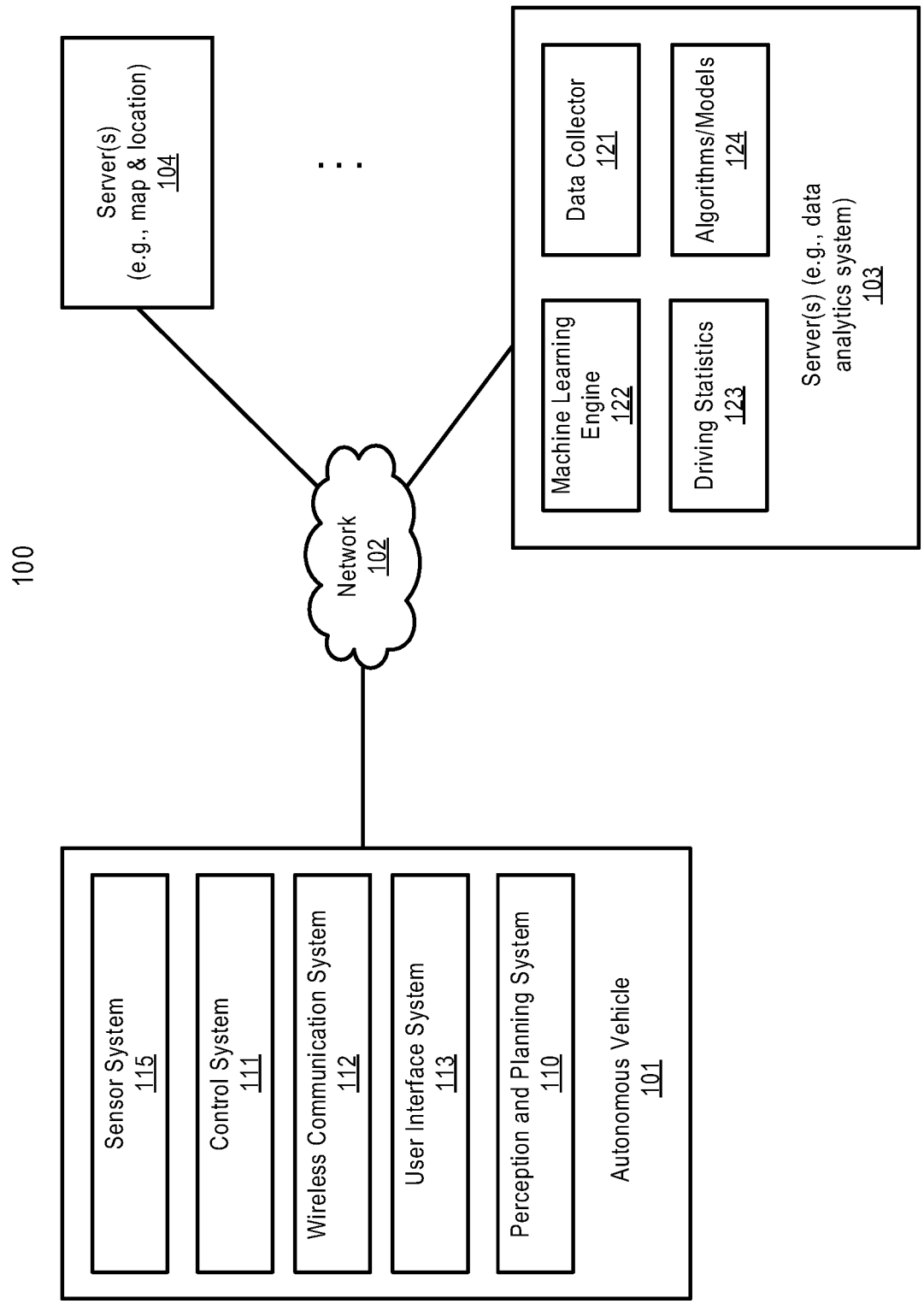
FIG. 1 is a block diagram illustrating a networked system according to one embodiment.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

Various embodiments of the invention provide systems and methods for dynamically adjusting behaviors of an ADV to emulate behaviors of a vehicle operated by a human driver when the ADV encounters an obstacle. A dynamic cost function can be used to collect real-time values of a set of parameters, and use the real-time values to constantly adjust a preferred safety distance where the ADV can be stopped ahead of the obstacle.

In one embodiment, an exemplary method includes the operations of determining a first distance to an obstacle in response to detecting the obstacle ahead of the ADV; and for each of a number of iterations, collecting a real-time value for each of a set of parameters, determining an offset to the first distance using the real-time value for each of the set of parameters, calculating a second distance based on the first distance and the offset, and controlling the ADV in view of the second distance using an expected value of each of the set of parameters, such that the ADV can stop at the second distance to the obstacle.

In one embodiment, there is no upper limit to the number of iterations as long as the ADV is running. In one implementation, the iteration can be performed in a closed loop, with each iteration performed in one planning cycle or multiple planning cycles of the ADV.

In one embodiment, the first distance is a safety distance calculated by a fixed-parameter cost function using a set of parameters without considering real-time values of the parameters. The set of parameters include a speed of the ADV, a distance of the ADV to the obstacle, and a speed limit in an environment surrounding the ADV. The real-time value for the speed of the ADV can be obtained from revolutions per minute (RPM) of an engine of the ADV, and/or data one or more sensors of the ADV. The real-time value of the distance of the ADV to the obstacle is collected from the one or more sensors of the ADV.

In one embodiment, the speed limit can be obtained from a digital map used by the ADV for route planning. The obstacle can be a pedestrian, a vehicle, or other human or non-human objects.

The above summary does not include an exhaustive list of all aspects of the present invention. It is contemplated that the invention includes all systems, computer media, and methods that can be practiced from all suitable combinations of the various aspects summarized above, and also those disclosed in the Detailed Description of the disclosure.

Autonomous Driving Vehicle

FIG. 1 is a block diagram illustrating an autonomous vehicle network configuration according to one embodiment of the disclosure. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) severs, or location servers, etc.

An autonomous vehicle refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
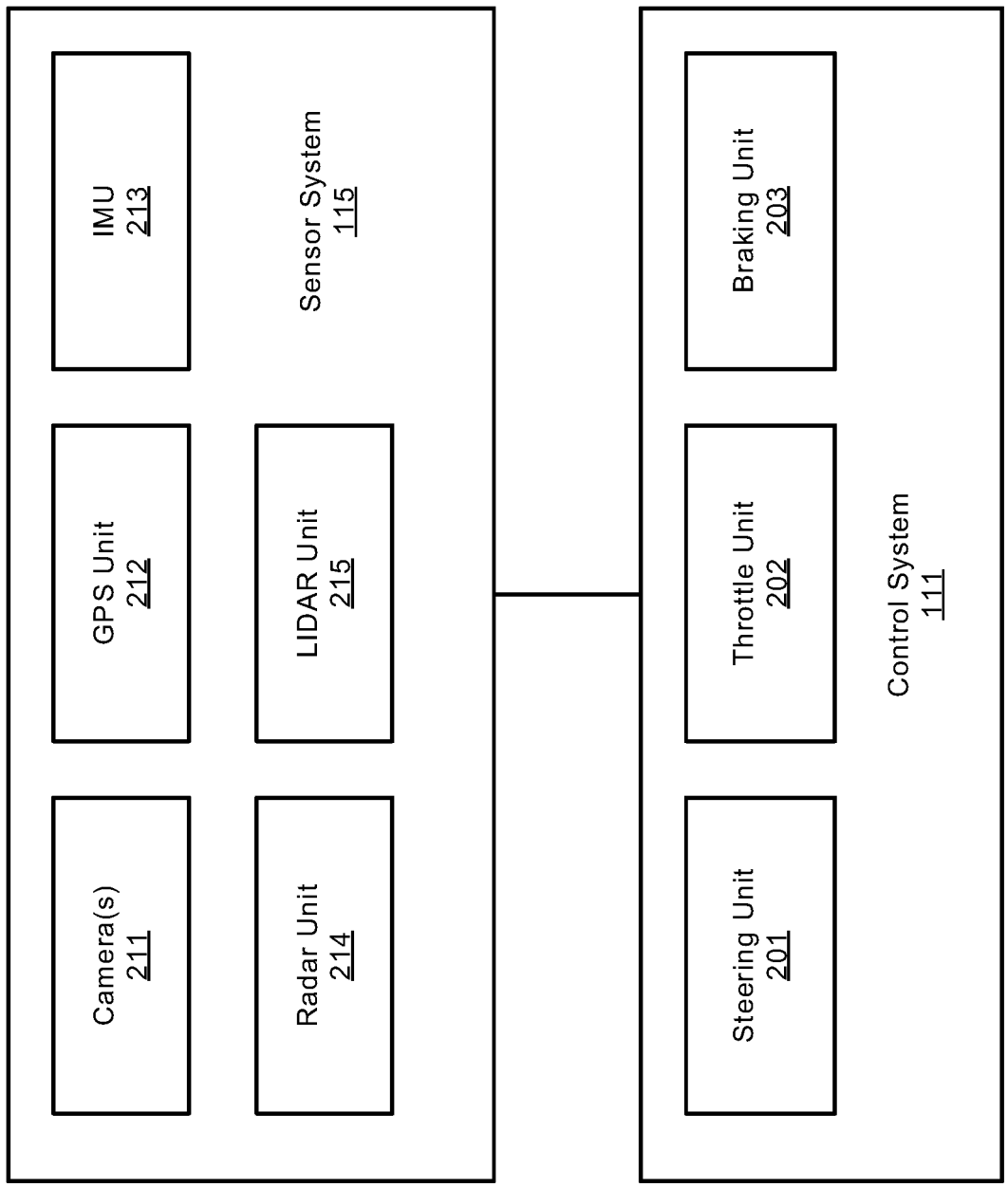
FIG. 2 is a block diagram illustrating an example of an autonomous vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn control the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyword, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or predictive models 124 for a variety of purposes. In one embodiment, for example, algorithms 124 may include an optimization method to optimize path planning and speed planning. The optimization method may include a set of cost functions (e.g., dynamic cost functions). These functions can be uploaded onto the autonomous driving vehicle to be used to generate a smooth path at real time.

Figure 3A:
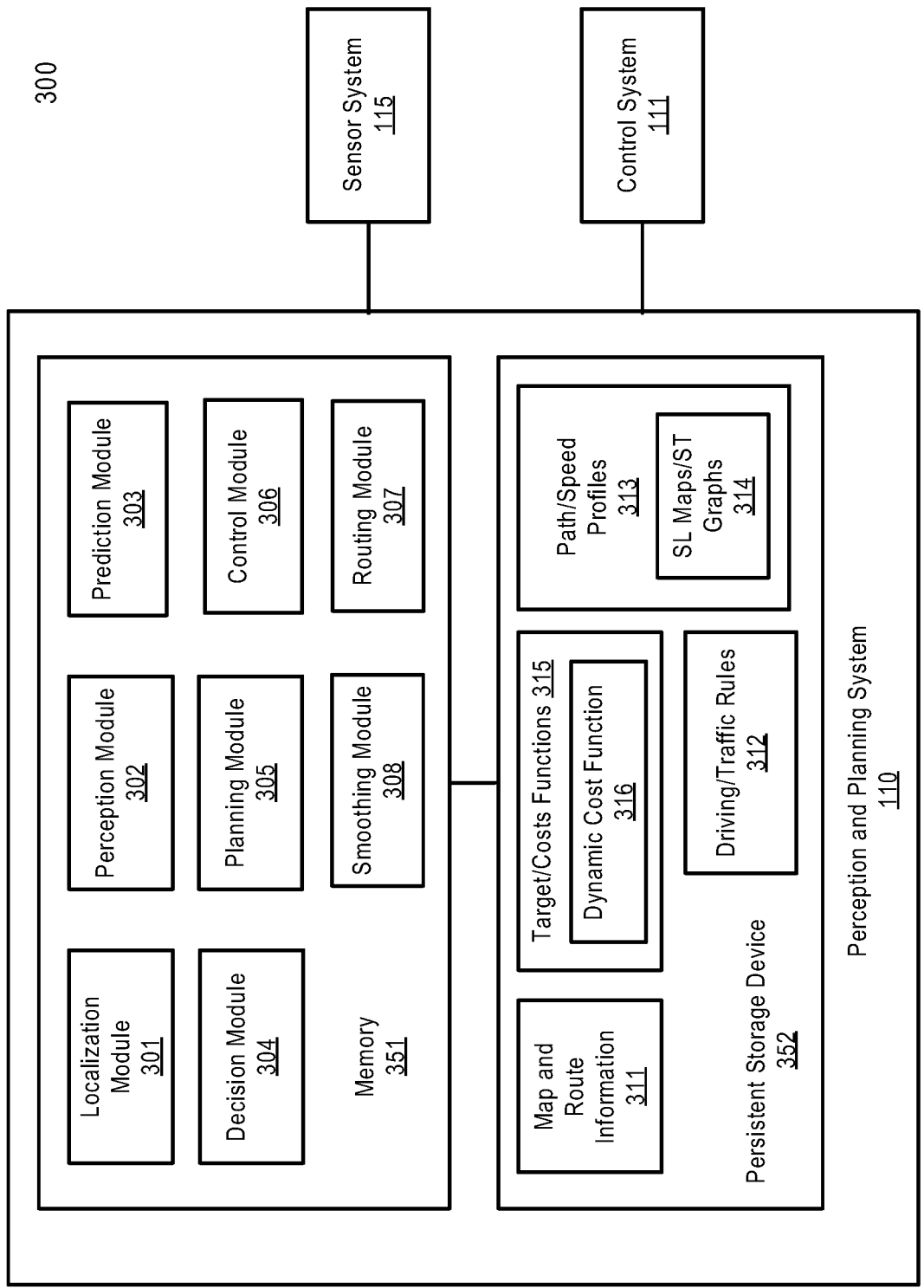
FIGS. 3A-3B are block diagrams illustrating an example of a perception and planning system used with an autonomous vehicle according to one embodiment.
Figure 3B:
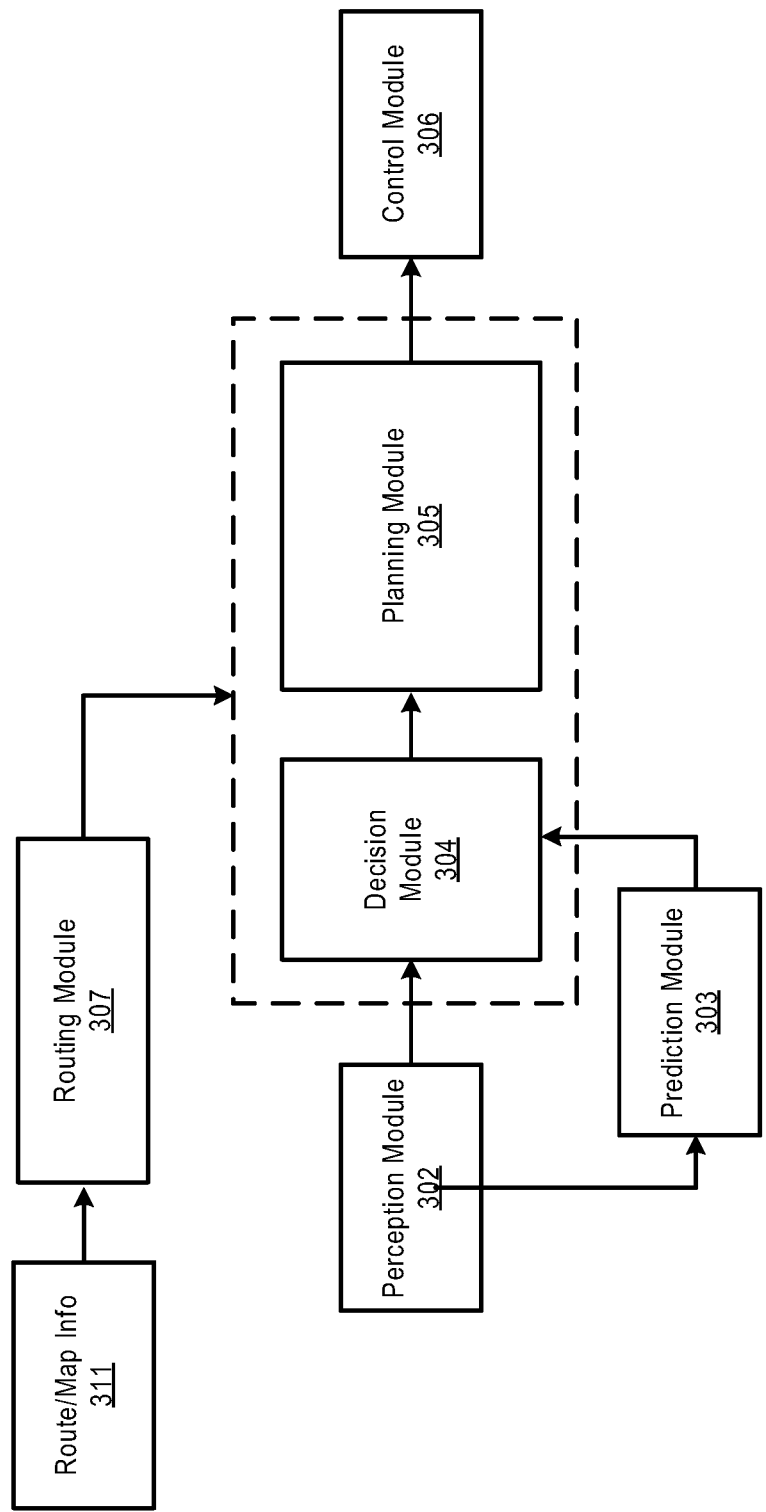

FIGS. 3A and 3B are block diagrams illustrating an example of a perception and planning system used with an autonomous vehicle according to one embodiment. System 300 may be implemented as a part of autonomous vehicle 101 of FIG. 1 including, but is not limited to, perception and planning system 110, control system 111, and sensor system 115. Referring to FIGS. 3A-3B, perception and planning system 110 includes, but is not limited to, localization module 301, perception module 302, prediction module 303, decision module 304, planning module 305, control module 306, routing module 307, and smoothing module 308.

Some or all of modules 301-308 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-308 may be integrated together as an integrated module. For example, decision module 304 and planning module 305 may be integrated as a single module; and routing module 307 and smoothing module 308 may be integrated as a single module.

Localization module 301 determines a current location of autonomous vehicle 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration (e.g., straight or curve lanes), traffic light signals, a relative position of another vehicle, a pedestrian, a building, crosswalk, or other traffic related signs (e.g., stop signs, yield signs), etc., for example, in a form of an object.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Based on a decision for each of the objects perceived, planning module 305 plans a path or route for the autonomous vehicle, as well as driving parameters (e.g., distance, speed, and/or turning angle). That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 miles per hour (mph), then change to a right lane at the speed of 25 mph.

Based on the planning and control data, control module 306 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, and turning commands) at different points in time along the path or route.

In one embodiment, the planning phase is performed in a number of planning cycles, also referred to as command cycles, such as, for example, in every time interval of 100 milliseconds (ms). For each of the planning cycles or command cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module.

Routing module 307 can generate reference routes, for example, from map information such as information of road segments, vehicular lanes of road segments, and distances from lanes to curb.

Based on reference points or lane reference points, routing module 307 may generate a reference line by interpolating the reference points such that the generated reference line is used as a reference line for controlling ADVs on the vehicular lane.

Smoothing module 308 can generate a smooth road reference line based on a reference line provided by routing module 307. For example, smoothing module 308 selects a number of control points along a reference line. In one embodiment, the control points can be reference points of the reference line provided by routing module 307 or some interpolated points along the reference line which are approximately equally distant to their adjacent points. Smoothing module 308 uses a combination of a quadratic programming spline smoother and a spiral smoother to generate the smooth road reference line.

In some embodiments, reference points can be converted into a relative coordinates system, such as station-lateral (SL) coordinates. A station-lateral coordinate system is a coordinate system that references a fixed reference point to follow a reference line. For example, a (S, L)=(1, 0) coordinate can denote one meter ahead of a stationary point (i.e., the reference point) on the reference line with zero meter lateral offset. A (S, L)=(2, 1) reference point can denote two meters ahead of the stationary reference point along the reference line and a one-meter lateral offset from the reference line, e.g., offset to the left by one meter.

In one embodiment, smoothing module 308 generates a smooth reference line based on reference points representing a reference line provided by routing module 307. The smooth reference line can be converted into a relative coordinate system such as a SL coordinate system before a decision module and/or a planning module such as decision module 304 and/and planning module 305 incorporates the smooth reference line with perceived obstacles and/or traffic information.

In one embodiment, decision module 304 generates a rough path profile based on a reference line (the reference line having been smoothed by smoothing module 308 as described above) provided by routing module 307 and based on obstacles and/or traffic information perceived by the ADV, surrounding the ADV. The rough path profile can be a part of path/speed profiles 313 which may be stored in persistent storage device 352. The rough path profile is generated by selecting points along the reference line. For each of the points, decision module 304 moves the point to the left or right (e.g., candidate movements) of the reference line based on one or more obstacle decisions on how to encounter the object, while the rest of points remain steady.

For example, in one embedment, the rough path profile is generated by a cost function consisting of costs based on: a curvature of path and a distance from the reference line and/or reference points to obstacles. Points on the reference line are selected and are moved to the left or right of the reference lines as candidate movements representing path candidates. Each of the candidate movements has an associated cost. The associated costs for candidate movements of one or more points on the reference line can be solved using dynamic programming for an optimal cost sequentially, one point at a time.

The candidate movements are performed iteratively using dynamic programming to path candidates in search of a path candidate with a lowest path cost using cost functions, as part of costs functions 315 of FIG. 3A, thereby generating a rough path profile. Examples of cost functions include costs based on: a curvature of a route path, a distance from the ADV to perceived obstacles, and a distance of the ADV to the reference line. In one embodiment, the generated rough path profile includes a station-lateral map, as part of SL maps/ST graphs 314 which may be stored in persistent storage devices 352.

In one embodiment, a state-lateral (SL) maps generator (not shown) generates an SL map as part of the rough path profile. An SL map is a two-dimensional geometric map (similar to an x-y coordinate plane) that includes obstacles information perceived by the ADV. From the SL map, path decision module 403 can lay out an ADV path that follows the obstacle decisions. Dynamic programming (also referred to as a dynamic optimization) is a mathematical optimization method that breaks down a problem to be solved into a sequence of value functions, solving each of these value functions just once and storing their solutions. The next time the same value function occurs, the previous computed solution is simply looked up saving computation time instead of recomputing its solution. The above process is referred to as a path planning process.

Once the path planning has been completed and a path has been generated, the ST graph with a speed cost function can be utilized to optimize a total speed cost for movement candidates (e.g., speed up/slow down) at different points in time along the path, which is referred to as speed planning. Each of the points (also referred to as trajectory points or path points) of a path is associated with a targeted or planned speed of the vehicle at that particular point in time, which may be represented by a speed cost corresponding to the point in time. The total speed cost for the path can be calculated by summing all of the speed costs of the individual points.

For example, in one embodiment, a total speed cost function can be:

$$\text{speed cost} = \Sigma_{points}(\text{speed}')^2 + \Sigma_{points}(\text{speed}'')^2 + (\text{distance})^2,$$

where the speed costs are summed over all time progression points, speed' denotes an acceleration value or a cost to change speed between two adjacent points, speed" denotes a jerk value, or a derivative of the acceleration value or a cost to change the acceleration between two adjacent points, and distance denotes a distance from the ST point to the destination location. Here, a speed costs module calculates a station-time graph by minimizing the speed cost using quadratic programming optimization.

In one embodiment, referring back to FIG. 4, the costs functions 315 can include a dynamic cost function 316, which implements an algorithm with a closed loop, in which parameters of a cost function are changed in real time. When encountering an obstacle, the ADV will first reduce its speed, and the dynamic cost function will change its parameters based on at least the ADV's current speed and distance to the obstacle. Once the parameters are changed, the ADV can behave differently according to the newly calculated cost. For example, the ADV may reduce its speed in front of the obstacle, after which the ADV's speed and distance to the obstacle are both reduced; the dynamic cost function then can change its parameters to calculating a new cost. With the new cost, the ADV would drive even slower as it approaches the obstacle. The dynamic cost function would enable the ADV to adopt a "drive-and-see" approach when encountering an obstacle.

In one embodiment, decision module 304 generates a rough speed profile (as part of path/speed profiles 313) based on the generated rough path profile. The rough speed profile indicates the best speed at a particular point in time controlling the ADV. Similar to the rough path profile, candidate speeds at different points in time are iterated using dynamic programming to find speed candidates (e.g., speed up or slow down) with a lowest speed cost based on cost functions, as part of costs functions 315 of FIG. 3A, in view of obstacles perceived by the ADV. The rough speed profile decides whether the ADV should overtake or avoid an obstacle, and to the left or right of the obstacle. In one embodiment, the rough speed profile includes a station-time (ST) graph (as part of SL maps/ST graphs 314). Station-time graph indicates a distance travelled with respect to time.

In one embodiment, planning module 305 recalculates the rough path profile in view of obstacle decisions and/or artificial barriers to forbid the planning module 305 to search the geometric spaces of the barriers. For example, if the rough speed profile determined to nudge an obstacle from the left, planning module 305 can set a barrier (in the form of an obstacle) to the right of the obstacle to prevent a calculation for the ADV to nudge an obstacle from the right. In one embodiment, the rough path profile is recalculated by optimizing a path cost function (as part of cost functions 315) using quadratic programming (QP) and/or a spiral smoother. In one embodiment, the recalculated rough path profile includes a station-lateral map (as part of SL maps/ST graphs 314).

Dynamic Cost Function

When a vehicle operated by a human driver encounters a pedestrian several meters ahead of the vehicle, the human driver may take a drive-and-see approach and drive the vehicle slowly towards the pedestrian to provoke the pedestrian to make way for the vehicle.

Under such an approach, the human driver may reduce the speed of the vehicle initially, and determine if the vehicle can proceed towards the pedestrian; if so, the human driver may continue to drive the vehicle with an even slower speed until the vehicle reaches a very close distance (e.g., 2~3 meters). The behaviors of the vehicle under the "drive-and-see" approach cannot be emulated by a vehicle using cost functions with fixed parameters.

Figure 4:
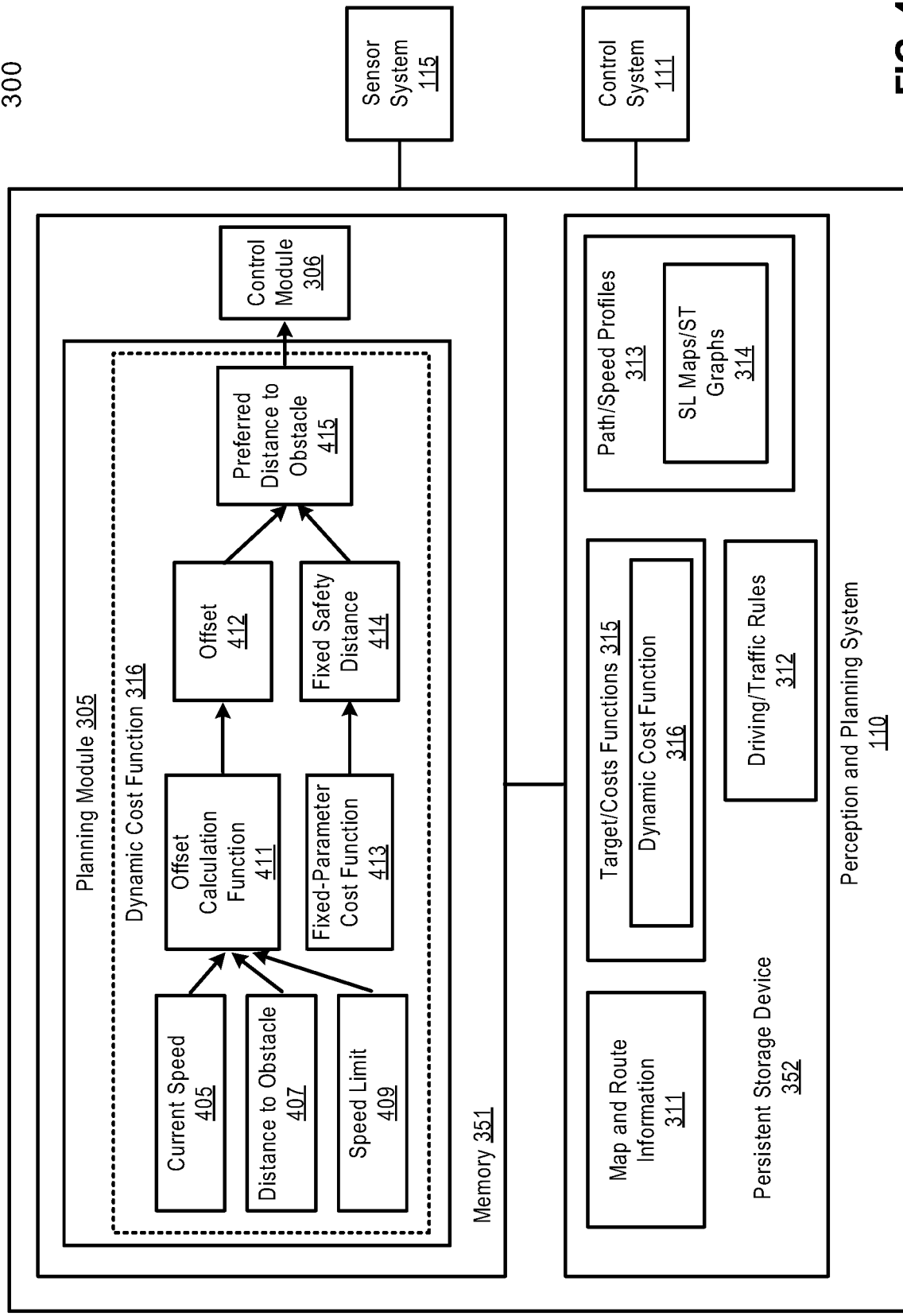
FIG. 4 illustrates an example system for using a dynamic cost function in an ADV to emulate behaviors of a vehicle operated by a human driver when encountering an obstacle, in accordance with an embodiment.

FIG. 4 illustrates an example system for using a dynamic cost function in an ADV to emulate behaviors of a vehicle operated by a human driver when encountering an obstacle, in accordance with an embodiment. The cost calculated by the dynamic cost function can be utilized as a part of a speed cost for speed planning of the vehicle. As described above, the speed cost utilized using the above speed cost function is configured with a set of fixed parameters or coefficients without considering the current speed of the vehicle, the distance between the vehicle and the obstacle, and the speed limit of the road in which the vehicle is driving.

As shown in FIG. 4, the dynamic cost function 316, which can be loaded into the memory 351 when the ADV 101 starts, can use real-time values for parameters to dynamically adjust the behaviors of the ADV. When encountering an obstacle, the ADV can first calculate a safety distance to the obstacle using a cost function with fixed parameters. The cost function does not consider the real-time values of the parameters, and will always generate the same results in a particular scenario as defined by the parameters.

In one embodiment, such a cost function can be implemented using a finite state machine, which defines a number of possible states of the ADV, for example, staying within a lane on a highway; changing lanes to the left; changing lane to the right; stopping at n meters ahead of an obstacle; and overtaking a car. The cost function can calculate several independent costs for each possible state, and add them up. The ADV can pick the state with the lowest total cost.

For example, one of the states can be stopping at 6 meters ahead of an obstacle. As long as the ADV is controlled by the fixed-parameter cost function, the ADV would stop at 6 meters ahead of the obstacle.

The action may not always ideal. For example, if the obstacle is a pedestrian standing there chatting with people. If the ADV stops at 6 meters ahead of the pedestrian, a deadlock may occur—the pedestrian may think that that the ADV has no intention to drive forward and therefore will continue standing there, whereas the ADV may robotically wait at 6 meters ahead of the obstacle.

Using the dynamic cost function 316, however, the ADV may not stop at the initially calculated safety distance. Instead, the ADV may execute the dynamic cost function 316, which executes a closed loop, and uses real-time values for a set of parameters of the dynamic cost function 316 to constantly adjust the safety distances to the obstacle. As the safety distances are being adjusted, the ADV can gradually approaches the obstacle until the ADV comes to a predetermined distance to the obstacle, for example 0.5 meter.

In one embodiment, when the ADV comes to the predefined distance, the pedestrian may detect that the ADV intends to pass, and therefore can make way for the ADV. The ADV may detect a new obstacle, and repeats the operations described above, until the new obstacle makes way for the ADV or until the ADV changes course to get round the obstacle in the event of a static obstacle.

In one embodiment, when encountering an obstacle, the ADV can first reduce its speed. The dynamic cost function 316 can take the ADV's current speed and current distance to the obstacle as real-time values for the set of parameters, to determine a new safety distance. In view of the new safety distance and the ADV's real-time distance/current to the obstacle, the ADV may drive slower and gradually approach the obstacle. The type of behaviors that the ADV displays under the control of the dynamic cost function 316 resemble "drive and see" behaviors of a vehicle driven by a human driver.

Referring back to FIG. 4, the dynamic cost function 316 can use a fixed-parameter cost function 413 to initially determine a fixed safety distance 414 to the ADV. The initially calculated safety distance 414 can represent a scenario with the lowest total cost compared with other scenarios when encountering an obstacle in a particular driving environment.

As used herein, a safety distance is a distance to an obstacle where the ADV can stop without bumping into the obstacle or otherwise hurting the obstacle. The obstacle can be a human object or a non-human object; and can be moving, standing or static.

The initially calculated safety distance 414 can be a fixed safety distance that does not change with real-time values of the parameters used to calculate the safety distance. In view of a particular driving environment and the initially calculated safety distance 414, the ADV may send a set of driving commands to the control module 306 with the expectation that the ADV will drive at a particular expected speed, such that the ADV can stop at the initially calculated safety distance 414.

In one embodiment, the actual speed may be different; the speed limit may also be different as the ADV moves into a different driving environment; and the current distance to the obstacle may also be different as the ADV is approaching the obstacle. The ADV may collect a current speed of the ADV 405, a current distance of the ADV 407, and a current speed limit 409, and use the real-time values to calculate an offset to the initially calculated distance using an offset calculation function 411. The ADV can determine a preferred distance to the obstacle 415 based on the offset 412 and the fixed safety distance 414, and send a set of driving commands in view of the preferred safety distance 415 to control the ADV.

As the ADV is moving towards a point having the preferred safety distance 415 to the obstacle, the values of one or more parameters or coefficients of the dynamic cost function 316 may change again. The real-time values of the parameters may be collected and fed into the offset calculation function to calculate a new offset, which can be used to calculate a new preferred distance to the obstacle 415. The ADV can subsequently be controlled using a set of new driving commands in view of the new preferred distance.

The above process can be repeated in a closed loop. As new preferred distances are generated, the ADV, rather than stopping at a fixed location, can gradually approach the obstacle, thereby emulating the behaviors of a vehicle operated by a human driver.

Each iteration in the closed loop can correspond to a planning cycle of the ADV, or multiple planning cycles. An example of the dynamic cost function 316 is illustrated below in Listing 1 in accordance with an embodiment.

Listing 1

$$\text{cost} = \frac{1}{\sqrt{2\pi}\,\sigma} e^{-\frac{1}{2}\frac{(d_{ex}-d_0)^2}{\sigma^2}} \text{ where}$$

$$d_{ex} = \sigma\sqrt{\ln(1e10) - \ln\ln(2\pi) - 2*\ln(\sigma)} \text{ and}$$

$$d_{ex} = d_{default} + \left(\left|\frac{v_{ego\text{-}vehicle}}{v_{speed\text{-}limit}}\right| - 0.5\right) * R_f$$

In Listing 1, the parameters $d_0$ and $v_{ego\text{-}vehicle}$ are collected from sensors in an ADV: $d_0$ represents a distance between the ADV (also referred to an ego-vehicle) and the obstacle; and $v_{ego\text{-}vehicle}$ represents the current speed of the ADV.

The parameters $d_{ex}$, σ, and cost are parameters calculated based on the parameters or sensor data collected from the sensors: $d_{ex}$ represents the preferred safety distance (i.e. the new expected distance) to the obstacle; σ represents a value associated with $d_{ex}$ and is used to adjust the shape or the cost output of the cost function (how fast it grows); and cost represents the final cost to determine ego-vehicle's speed according to the calculated $d_{ex}$.

The parameters $d_{default}$ and $R_f$ are fixed parameters: $d_{default}$ represents a default distance to obstacle (e.g., n meters); and $R_f$ is used to linearly adjust the relation between $d_{ex}$ and $v_{ego\text{-}vehicle}$. The parameters $d_{default}$ and $R_f$ are values set based on historical data, and are fixed once the ADV system starts.

In one embodiment, $d_{ex}$ can be calculated based on $d_{default}$ and $v_{ego\text{-}vehicle}$. After the ADV system starts, it collects the values of $v_{ego\text{-}vehicle}$ and $d_0$ in real time, which are used to determine $d_{ex}$ and σ. The cost calculated using the functions in Listing 1 can be used to controls the ego-vehicle's speed.

FIGS. 5A-5C graphically illustrate an example of a process performed by a dynamic cost function in accordance with an embodiment. In FIG. 5A, an ADV 501 detects a human obstacle 509 ahead of the ADV 501, and calculates a fixed safety distance 505, which can be a distance that the ADV 501 would have stopped if the ADV was controlled using the fixed-parameter cost function 413 as described in FIG. 4.

However, using the dynamic cost function, while the ADV is driving towards a point 502 that has the fixed safety distance 505 to the human obstacle, real-time values of a number of parameters that the dynamic cost function uses to calculate a safety distance can be collected, which include a speed limit 508, a current speed of the ADV 501, and a current distance of the ADV 501 to the human obstacle can be collected in real time. Based on the collected real-time values, the dynamic cost function can calculate an offset A 503, which is a distance between the point 502 and a point 504. The offset A 503 represents a distance that the ADV 501 can continue moving from the originally calculated fixed safety distance 505 towards the human obstacle 509. Therefore, using the originally calculated fixed safety distance 505 and the offset A 503, a preferred safety distance A 506 can be calculated to represent a distance that the ADV 501 would stop based on the set of real-time values collected during a particular planning cycle of the ADV 501.

During a planning cycle that is different from the planning cycle when the preferred safety distance A 506 is calculated, the ADV 501 can collect the speed limit 508, a current speed of the ADV 501, and a current distance of the ADV 501 to the human obstacle 509. As shown during this planning cycle, the speed limit 508 does not change, but the current speed of the ADV and the current distance have changed. As shown in FIG. 5A, the current speed (i.e., actual speed) is higher than the expected speed, and the ADV 501 is closer to the obstacle 509 when the real-time values for the parameters are being collected. Therefore, in FIG. 5B, the dynamic cost function can calculate a cost based on a new offset 510 based on the real time values of the parameters, and calculate a new preferred safety distance 511 based on the new offset 510 and the fixed safety distance 505. The cost can be utilized as a part of speed planning for the vehicle. Speed planning refers to determining the speed of the vehicle at different trajectory points along the path planned by planning module 305.

In this example, the new offset 510 is shorter than the offset 505 calculated in FIG. 5A since the actual speed of the ADV 501 had been higher than the expected speed when the offset 505 was being calculated. As such, instead of stopping at point 504, the ADV is expected to stop at point 507 that has the preferred safety distance 511. As the ADV 501 is approaching the point 507, the ADV can collect the current speed of the ADV, the current distance of the ADV and the speed limit to calculate a new offset 514, and a new preferred safety distance 515. The new preferred safety distance 515 may be utilized as a part of one of the parameters or coefficients of a cost function to calculate a new cost for speed planning of the ADV. Since the cost function is dynamically adjusted or modified and the speed planning is performed using the newly updated cost function in view of the driving environment (e.g., vehicle speed, speed limit, distance between the obstacle and the ADV) during each planning cycle, the ADV can be controlled in a manner that mimics what a human driver will do under the same or similar circumstances.

The above process can be repeated for each planning cycle or for each n planning cycles, where n can be any integer that is greater than 1. When the ADV 501 moves to a point that has a predetermined distance (e.g., 1 meter), the process may stop generating new preferred safety distances and calculating cost using the dynamic cost function, etc. For example, based on the speed of the ADV, the distance between the ADV and the obstacle, and the speed limit of the road, the cost function is adjusted and the new cost is calculated. If the new cost is too high (e.g., a predetermined threshold), the process may cause the vehicle to stop at the current location. That means, the vehicle should not move forward any more. The speed planning for the vehicle may plan a zero speed for the vehicle. As soon as the human obstacle 509 moves to make way for the ADV, the above process may start over again, as the new cost dynamically calculated as described above may drop (e.g., below the predetermined threshold).

Figure 6:
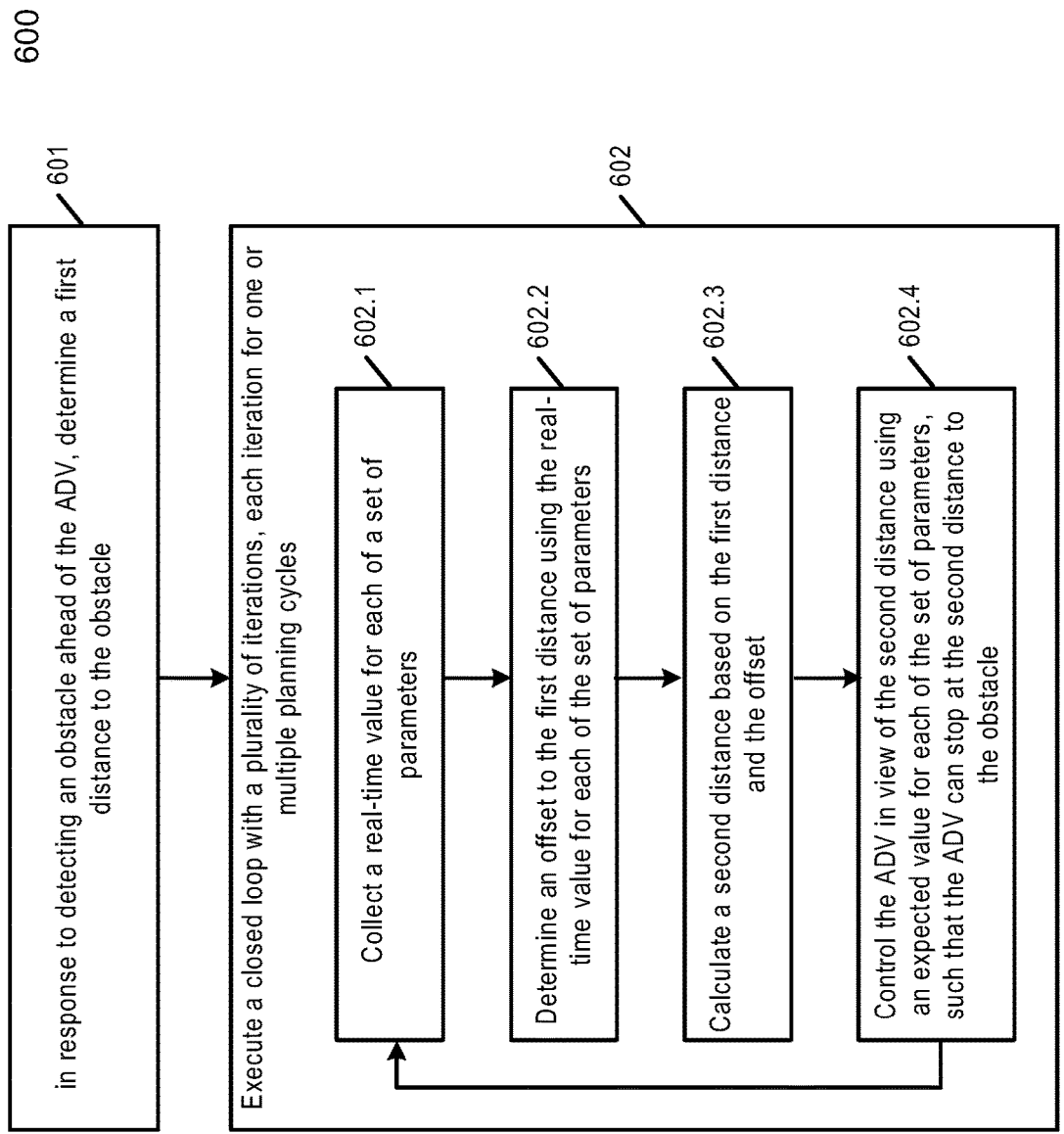
FIG. 6 illustrates an example process of using a dynamic cost function in an ADV to emulate behaviors of a vehicle operated by a human driver when encountering an obstacle, in accordance with an embodiment.

FIG. 6 is a flow diagram illustrating an example of a process 600 of emulating behaviors of a vehicle operated by a human driver using a dynamic cost function when encountering an obstacle, in accordance with an embodiment. Process 600 may be performed by processing logic which may include software, hardware, or a combination thereof. For example, process 600 may be performed by the dynamic cost function 316 when it is invoked by the planning module 305 of FIG. 4.

Referring to FIG. 6, in operation 601, the processing logic determines a first distance to the obstacle in response to detecting an obstacle ahead of the ADV. In operation 602, the processing logic execute a closed loop 602, in which each iteration of the loop is performed in one or multiple planning cycle of the ADV. For each iteration, a number of operations are performed. In operation 602.1, the processing logic collects a real-time value for each of a set of parameters. In operation 602.2, the processing logic determines an offset to the first distance using the real-time value for each of the set of parameters. In operation 602.3, the processing logic calculates a second distance based on the first distance and the offset. In operation 602.4, the processing logic control the ADV in view of the second distance using an expected value for each of the set of parameters, such that the ADV can stop at the second distance to the obstacle. In one embodiment, a cost function is adjusted based on the distance between the ADV and the obstacle, the speed of the ADV, and the speed limit of the road in which the ADV is driving. The cost is then calculated based on the modified cost function and the speed planning is performed for the ADV based on the cost. When the cost is above a predetermined threshold (e.g., too high), the process will stop the vehicle at the current location.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

All of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

The invention claimed is:

1. A computer-implemented method for operating an autonomous driving vehicle (ADV), the method comprising:
   in response to detecting an obstacle ahead of the ADV, determining a first distance from the ADV to the obstacle; and
   performing the following operations in each of a plurality of iterations, each iteration corresponding to one of a plurality of planning cycles,
      determining an offset to the first distance based on a real-time value for each of a set of a plurality of parameters,
      calculating a second distance based on the first distance and the offset, and
      performing speed planning based on the second distance to control a speed of the ADV, such that the ADV can decelerate and stop at a point with the second distance to the obstacle.

2. The method of claim 1, wherein the plurality of iterations is performed within a closed loop, and wherein each iteration is performed by a planning cycle of the ADV.

3. The method of claim 1, wherein the first distance of the ADV to the obstacle is determined using a cost function based on a plurality of fixed parameters.

4. The method of claim 1, wherein the set of parameters include a speed of the ADV, a distance of the ADV to the obstacle, and a speed limit in an environment surrounding the ADV.

5. The method of claim 4, wherein the real-time value for the speed of the ADV is obtained from one or more of revolutions per minute (RPM) of an engine of the ADV, or data collected from one or more sensors of the ADV.

6. The method of claim 4, wherein the real-time value of the distance of the ADV to the obstacle is collected from one or more sensors of the ADV.

7. The method of claim 4, wherein the speed limit is collected from a digital map used by the ADV for route planning.

8. The method of claim 1, wherein the obstacle is one of a pedestrian or a vehicle, wherein each of the pedestrian or the vehicle is standing or moving.

9. A non-transitory machine-readable medium having instructions stored therein for operating an autonomous driving vehicle (ADV), the instructions, when executed by a processor, causing the processor to perform operations, the operations comprising:
   in response to detecting an obstacle ahead of the ADV, determining a first distance from the ADV to the obstacle; and performing the following operations in each of a plurality of iterations, each iteration corresponding to one of a plurality of planning cycles,
determining an offset to the first distance based on a real-time value for each of a set of a plurality of parameters,
calculating a second distance based on the first distance and the offset, and
performing speed planning based on the second distance to control a further speed of the ADV, such that the ADV can decelerate and stop at a point with the second distance to the obstacle.

10. The non-transitory machine-readable medium of claim 9, wherein the plurality of iterations is performed within a closed loop, and wherein each iteration is performed by a planning cycle of the ADV.

11. The non-transitory machine-readable medium of claim 9, wherein the first distance of the ADV to the obstacle is determined using a cost function based on a plurality of fixed parameters.

12. The non-transitory machine-readable medium of claim 9, wherein the set of parameters include a speed of the ADV, a distance of the ADV to the obstacle, and a speed limit in an environment surrounding the ADV.

13. The non-transitory machine-readable medium of claim 12, wherein the real-time value for the speed of the ADV is obtained from one or more of revolutions per minute (RPM) of an engine of the ADV, or data collected from one or more sensors of the ADV.

14. The non-transitory machine-readable medium of claim 12, wherein the real-time value of the distance of the ADV to the obstacle is collected from one or more sensors of the ADV.

15. The non-transitory machine-readable medium of claim 12, wherein the speed limit is collected from a digital map used by the ADV for route planning.

16. The non-transitory machine-readable medium of claim 9, wherein the obstacle is one of a pedestrian or a vehicle, wherein each of the pedestrian or the vehicle is standing or moving.

17. A data processing system, comprising:
a processor; and
a memory coupled to the processor to store instructions, which when executed by the processor, cause the processor to perform operations of operating an autonomous driving vehicle (ADV), the operations including:
in response to detecting an obstacle ahead of the ADV, determining a first distance from the ADV to the obstacle; and
performing the following operations in each of a plurality of iterations, each iteration corresponding to one of a plurality of planning cycles,
determining an offset to the first distance based on a real-time value for each of a set of a plurality of parameters,
calculating a second distance based on the first distance and the offset, and
performing speed planning based on the second distance to control a further speed of the ADV, such that the ADV can decelerate and stop at a point with the second distance to the obstacle.

18. The system of claim 17, wherein the plurality of iterations is performed within a closed loop, and wherein each iteration is performed by a planning cycle of the ADV.

19. The system of claim 17, wherein the first distance of the ADV to the obstacle is determined using a cost function based on a plurality of fixed parameters.

20. The system of claim 17, wherein the set of parameters include a speed of the ADV, a distance of the ADV to the obstacle, and a speed limit in an environment surrounding the ADV.

* * * * *